Feb. 27, 1962     NOBUO SENSUI ET AL     3,022,863
AUTOMATIC GREASING DEVICE FOR VEHICLES
Original Filed Sept. 17, 1958
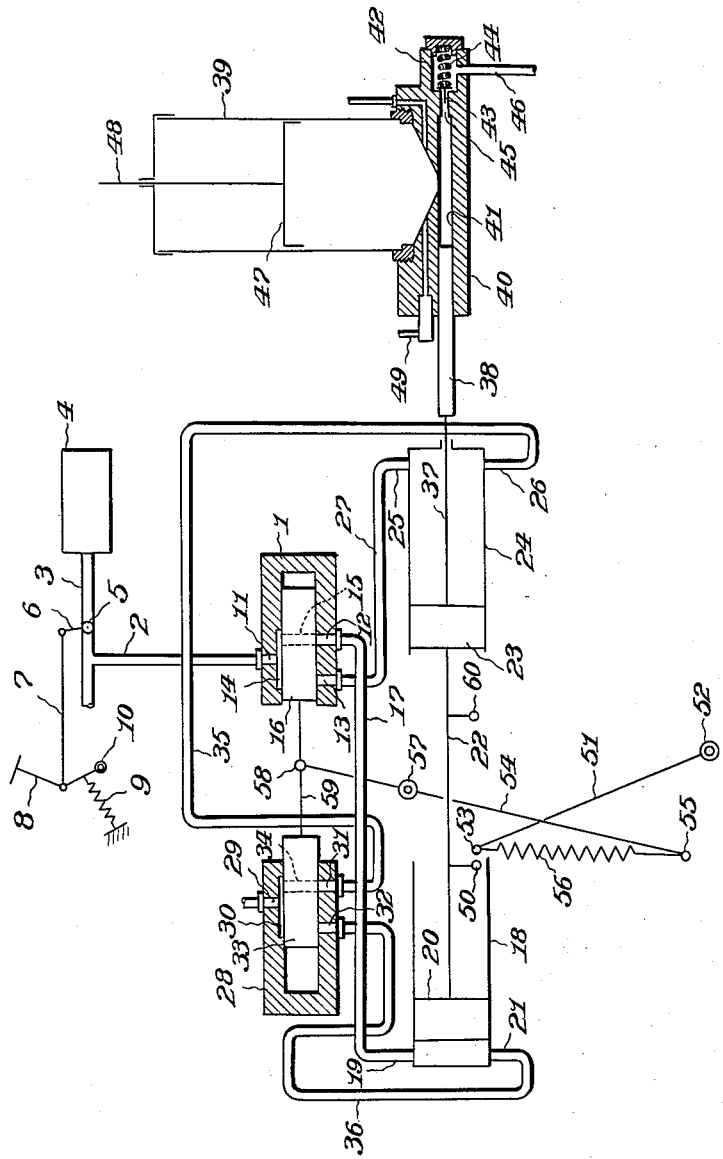

United States Patent Office 3,022,863
Patented Feb. 27, 1962

3,022,863
AUTOMATIC GREASING DEVICE FOR VEHICLES
Nobuo Sensui, Yokohama-shi, and Shigeru Aoki, Tokyo-to, Japan, assignors to Shibaura Kyodokogyo Kabushiki Kaisha, Yokohama-shi, Japan, a limited liability company of Japan
Original application Sept. 17, 1958, Ser. No. 761,645. Divided and this application Apr. 27, 1960, Ser. No. 37,012
Claims priority, application Japan Sept. 30, 1957
1 Claim. (Cl. 184—7)

This invention relates to a greasing device for vehicles, more particularly to a greasing device wherein lubricating grease is supplied to the desired parts of the vehicle by a grease feed pump which is mounted on the vehicle and actuated intermittently by a hydraulic device or a vacuum device.

Ordinary vehicles such as, motor cars, railway cars and the like have many parts requiring a constant supply of lubricating grease such as, for instance, bearings, couplings, springs, etc. Heretofore, a grease gun has been utilized to supply a lubricant such as grease to the many parts requiring greasing. However, greasing of many parts with grease guns containing a lubricant of high viscosity not only require substantial labor, but also results in too much or too little grease being supplied or sometimes the omission of greasing of important parts.

On the other hand, if lubricant is supplied by an oil pump which is driven constantly by an electric motor or an engine, the amount of lubricant fed to the parts requiring oiling may become excess, so that lubricant consumption would be too expensive. This also requires a large lubricant reservoir which is not practical in small vehicles such as motor cars. Therefore, it has been desired to provide a greasing device or greasing system which is simple and compact in construction, which can supply automatically an adequate quantity of lubricant to a plurality of parts of a vehicle and can be easily installed in any type of existing vehicle with minimum cost.

An important object of this invention is to provide a greasing device which operates intermittently and which can fulfill the above mentioned desire.

Another object of this invention is to provide a greasing device which is simple in construction and can supply an adequate quantity of lubricant with minimum labor to a plurality of moving parts of a vehicle.

Still another object of this invention is to provide a greasing device wherein a grease pump is actuated by fluid pressure contained in a reservoir mounted on a vehicle, under control of an operating mechanism as the brake or clutch pedals or other levers which are used intermittently.

A further object of this invention is to provide a greasing device wherein a vacuum system for the braking device for the vehicle is utilized for actuating a grease pump so that said grease pump may be operated whenever a braking pedal is depressed to effect braking.

In accordance with this invention, a grease pump, preferably a reciprocating type grease pump, is provided between a lubricant tank or reservoir and a pipe line leading to the moving parts to be greased, and an actuating device for said grease pump is provided, said actuating device being arranged to be operated intermittently in response to the operation of a braking pedal, a clutch pedal or a lever and the like which is not used continuously, but used only intermittently.

In accordance with one aspect of this invention, said actuating device for the grease pump comprises a cylinder having a piston which is supplied with a fluid under pressure such as compressed air, under the control of a valve actuated by an intermittently operated means on the vehicle such as the braking pedal or a clutch pedal and the like.

In accordance with another aspect of this invention, said actuating device for the grease pump comprises a vacuum operating device connected to a vacuum system for effecting braking of the vehicle.

In both embodiments, suitable change-over valves are provided in operative relation with said actuating device so as to periodically reverse the operation thereof for imparting a reciprocating motion to the plunger of the grease pump.

For a better understanding of this invention, reference may be made to the following description taken in conjunction with the accompanying drawing wherein:

The single FIGURE is a schematic view of a greasing device embodying this invention utilizing a fluid under pressure, wherein some portions are shown in section.

Referring to the drawing, there is shown a change-over valve 1 for supplying a fluid under pressure. The change-over valve 1 is supplied with an actuating fluid under pressure, such as compressed air or pressure oil, from a suitable reservoir 4 by way of supply pipes 2 and 3 under the control of a valve 5 provided in the pipe 3. The valve 5 is actuated by a foot pedal 8 provided in the driver's compartment of the vehicle through a pair of interconnected links 6 and 7. Thus, when the pedal is depressed, it will turn around the pivot 10 against the bias of a compression spring 9 to open the valve 5. When the valve 5 is opened, the fluid under pressure in the reservoir 4 will be supplied to a braking device (not shown) through the pipe 3 and also to the changeover valve 1 through the supply pipe 2.

The casing of the change-over valve 1 is formed to act as a cylinder and is provided with an inlet port 11 and two outlet ports 12 and 13, the outer end of the inlet port being in communication with said supply pipe 2 and the inner end thereof opening into a slot 14 provided in a portion of the inner periphery of the valve casing. In the cylinder bore of the casing, there is provided a piston 16 having a transverse aperture or passage 15 arranged in such a manner that one end thereof always communicates with said slot 14 while the other end is alternately brought into communication with the outlet ports 12 and 13, respectively, as the piston reciprocates in the casing, as will be explained later more in detail. In the drawing, the aperture 15 is shown as being in communication with the outlet port 12. Under this condition, the fluid under pressure flows from supply pipe 2 through the inlet port 11, slot 14, hole 15, outlet port 12 and then through a pipe 17 to an inlet 19 provided at one end of a cylinder 18. The pressurized fluid introduced to the closed end of the cylinder 18 functions to urge a piston 20 in the cylinder 18 towards the right as viewed in the drawing, the outlet port 21 of the cylinder 18 which is provided at the position opposite the inlet port 19 being made to close at said operation stage, as will be explained later. Right-hand movement of the piston 20 will push a piston 23 in a cylinder 24 toward the right through a common piston rod 22. At the closed end of the cylinder 24, there are provided opposed ports 25 and 26, the former being connected to the outlet port 13 through a pipe 27. Opposite the change-over valve 1, there is provided a similar exhaust side change-over valve 28 comprising a cylinder casing provided with an exhaust port 29 opening in a slot 30 which is similar to the slot 14 and a pair of spaced ports 31 and 32 which are situated on the opposite sides of said port 29. These ports 31 and 32 are arranged so as to be brought in communication with a transverse aperture 34 provided in a piston 33 when the piston reciprocates in the valve casing 28. The other end of the aperture 34 remains in communication with the slot 30 during said reciprocating movement of the piston 33. The port 31 is in communication with said port 26 of the cylinder 24 through a pipe 35, and the port 32 with said port 21 of the cylinder 18 through a pipe 36. When the piston 33 is in its right-hand position as shown in the drawing, the path through the port 21, pipe 36 and port 32 is shut off by this piston so that the fluid under pressure introduced in the closed end of the cylinder 18 is effective to urge the pistons 20 and 23 to the right, as explained above. At this time, as the path through the port 25 of the cylinder 24, pipe 27 and the port 13 is also shut off by the piston 16, the fluid contained in the cylinder 24 is vented to the atmosphere through the port 26, pipe 35, port 31, transverse hole 34 in the piston 33 and the port 29. Therefore, the piston 23 can move smoothly to the right. By this movement of the piston 23, a plunger 38 of a grease pump connected to the piston 23 through a piston rod 37 is also urged to the right to send out a quantity of grease, as will be explained later. The plunger 38 is arranged to slide in a cylinder 41 provided in a base plate 40 supporting a lubricating grease tank 39 having a frusto-conical bottom communicating with the cylinder 41. Therefore, the grease in the tank 39 is successively sent out by the reciprocating motion of the plunger 38. A check valve chamber 42 is provided in the base plate 40 containing therein a check valve 43 normally biased by a compression spring 44 to close a port 45 between the cylinder 41 and the chamber 42. The chamber 42 is further provided with an outlet port 46 leading to various moving parts of the vehicle requiring greasing through an appropriate distributing valve (not shown). When the quantity of the grease in the tank 39 decreases, a plate 47 floating on the grease descends and withdraws an indicating rod 48 extending through the upper cover of the tank into the tank 39 to indicate the quantity of the grease remaining in the tank. In order to supplement the lubricant to the tank 39, a feed pipe 49 containing a proper check valve (not shown) may be provided in the base plate 40.

When the pistons 20 and 23 move in unison to the right, a projection 50 of the piston rod 22 will engage with the free end 53 of a lever 51 which is pivotally mounted on a support 52, the free end 53 of which is adapted to swing in a clockwise direction around the support 52. Between the free end 53 of the lever 51 and the lower end 55 of a lever 54 pivoted at 57 and having its upper end connected at 58 to a piston rod 59 which interconnects the pistons 16 and 33 of the change-over valves, there is interposed a tension spring 56 so that the pistons 20 and 23 may be biased to their left-hand positions shown in the drawing.

When, however, the projection 50 engages with the free end 53 of the lever 51 to rotate it in the clockwise direction, the spring 56 will also be rotated in the same direction around the free end 55 of the lever 54 until the free end passes through a dead point, at which time the lever 54 will rotate in the counter-clockwise direction, with a snap action, around its pivot 57. Accordingly, the upper end of the lever 54 is snapped toward the left to shift pistons 16 and 33 of the change-over valves in the same direction. Right-hand movement of the pistons 20 and 23 as well as the plunger 38 will open the check valve 43 to send out a predetermined quantity of the grease oil through the outlet port 46.

If the pedal 8 is still in its depressed position to open the valve 5, the fluid under pressure contained in the reservoir 4 will be supplied to the right hand end of the cylinder 24 via the pipe 2, inlet port 11, opening 15, outlet port 13, pipe 27 and port 25, whereby the pistons 23 and 20 will be urged to move in the opposite direction. Accordingly, the plunger 38 will be returned to the position shown in the drawing to draw the grease in the tank 39 into the cylinder 41. The return movement of the piston 20 will cause the fluid under pressure in the cylinder 18 to exhaust into the surrounding atmosphere by way of the outlet port 21, pipe 36, port 32, opening 34 and exhaust port 29, whereas the path through the port 19 is closed at the outlet port 12 by the piston 16, thus preventing the fluid from exhausting through this path.

As the piston 23 moves to the left, a second projection 60 which is provided on the piston rod 22 at a point spaced with respect to the first mentioned projection 50, will engage with the free end 53 of the lever 51, which has been brought to a position near the projection 60 by the previous over-center motion, to urge the free end 53 to move toward the end through the dead center. At the instant when the free end passes through the dead center, the lever 54 will rotate, with a snap action, in the clockwise direction to reset the pistons 16 and 33 in the change-over valve to the original position shown in the drawing.

Thus, as long as the valve 5 is maintained in its opened position, that is, the pedal 8 is maintained at its depressed position for actuating the braking device of the vehicle, the fluid under pressure will be introduced alternately to the cylinders 18 and 24 under the control of the associated change-over valves to make the plunger 30 of the grease pump reciprocate to feed oil intermittently.

When the pedal 8 is released to close the valve, the supply of the fluid under pressure will be interrupted and the greasing operation will also be stopped.

Lubricant supply can be made to occur for any multiple of the number of actuations of the brake pedal of a vehicle. Said multiple can be adequately selected by proper design of parts of the greasing system.

While, in the above description, the greasing devices of this invention has been described as being actuated by the depression of a braking pedal of a vehicle, it should be understood that various other actuating devices, such as a clutch pedal, a push button, a lever and the like which are operated intermittently on the vehicle may also be used for actuating the greasing device of this invention.

It should therefore be understood that this invention is not limited to the specific details of construction and arrangement herein illustrated, and that changes and modifications may be made by one skilled in the art without departing from the true scope and spirit of this invention.

This is a division of my application Serial No. 761,645, filed September 17, 1958, now abandoned.

What we claim is:

A grease device for a vehicle, which comprises a greasing pump including a reciprocating plunger and arranged between a grease tank and an outlet pipe leading to various parts of said vehicle requiring greasing, a source of a fluid under pressure, a valve actuated by a pedal of said vehicle, a pair of opposed cylinders, each containing a piston therein and each cylinder having a closed end provided with a pair of ports, a piston rod for interconnecting said pistons and said plunger, a pair of spaced projections on said piston rod, a pair of change-over valves for controlling the supply and exhaust of said fluid under pressure to and from said cylinders, one of said change-over valves comprising a casing having an inlet port communicating with said source of fluid through said pedal-actuated valve, and two axially spaced outlet ports communicating respectively with one of the pair of ports of both of said opposed cylinders, and a piston slidable in said casing having a transverse aperture for connecting said inlet port selectively with each of said outlet ports depending on the position of said piston in said casing, and the other of said change-over valves comprising a second casing having a second exhaust port and a pair of axially spaced second inlet ports communicating respectively with the other of said pair of ports of both of said opposed cylinders, and a second piston slidable in said second casing having a transverse aperture for connecting said second exhaust port selectively with each of said second inlet ports depending on the position of said second piston in said second casing, a piston rod interconnecting said pistons of said change-over valves and an over center mechanism actuated by said projections, said mechanism including a pivoted lever arranged to be engaged by said projections, a lever pivoted at an intermediate point and with one end connected to said piston rod of said change-over valves and a spring interposed between the free ends of said levers.

References Cited in the file of this patent

UNITED STATES PATENTS

| | | |
|---|---|---|
| 837,252 | Rose | Nov. 27, 1906 |
| 1,654,673 | Barks | Jan. 3, 1928 |
| 1,987,256 | Johnson et al. | Jan. 8, 1935 |
| 2,090,575 | DeMotte | Aug. 17, 1937 |
| 2,703,557 | Polki | Mar. 8, 1955 |